US008072618B2

(12) United States Patent
Aiso

(10) Patent No.: US 8,072,618 B2
(45) Date of Patent: Dec. 6, 2011

(54) PRINTING APPARATUS, IMAGE DATA FILE PROCESSING APPARATUS, METHOD OF SELECTING IMAGE DATA FILE, METHOD OF ASSISTING SELECTION OF IMAGE DATA FILE, AND COMPUTER PROGRAM

(75) Inventor: Seiji Aiso, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1287 days.

(21) Appl. No.: 11/729,168

(22) Filed: Mar. 28, 2007

(65) Prior Publication Data

US 2007/0229857 A1 Oct. 4, 2007

(30) Foreign Application Priority Data

Mar. 28, 2006 (JP) ................. 2006-088094

(51) Int. Cl.
*G06F 3/12* (2006.01)
*H04N 1/21* (2006.01)
(52) U.S. Cl. ........................................ 358/1.1; 358/302
(58) Field of Classification Search .................. 358/1.1, 358/1.9, 1.13, 1.15, 1.18, 302, 448; 707/1, 707/102; 348/211.1, 231.2, 207.99, 333.1
See application file for complete search history.

(56) References Cited

U.S. PATENT DOCUMENTS

| 7,184,082 | B2 | 2/2007 | Yokokawa |
| 2002/0030746 | A1* | 3/2002 | Shibutani ...................... 348/207 |
| 2005/0141008 | A1* | 6/2005 | Billow et al. ................ 358/1.13 |
| 2005/0289111 | A1* | 12/2005 | Tribble et al. .................... 707/1 |
| 2007/0097247 | A1 | 5/2007 | Yokokawa |

FOREIGN PATENT DOCUMENTS

| JP | 2003-63076 A | 3/2003 |
| JP | 2004-236120 | 8/2004 |
| JP | 2005-33502 A | 2/2005 |

* cited by examiner

*Primary Examiner* — Gabriel Garcia
(74) *Attorney, Agent, or Firm* — Nutter McClennen & Fish LLP; John J. Penny, Jr.; Michael P. Visconti, III

(57) ABSTRACT

A printing apparatus that selects and prints images represented by candidate image data files to be output among a plurality of image data files includes an image data file acquisition unit that acquires a plurality of image data files, each having image data regarding an image and additional data regarding at least a photographing condition when the image was taken, and a candidate file selection unit that selects image data files, which have the additional data, not the image data, satisfying one of one or more predetermined selection conditions, among the plurality of image data files as the candidate image data files to be output, and a printing unit that performs printing of images represented by at least some of the candidate image data files.

14 Claims, 10 Drawing Sheets

PRINTING APPARATUS, IMAGE DATA FILE PROCESSING APPARATUS, METHOD OF SELECTING IMAGE DATA FILE, METHOD OF ASSISTING SELECTION OF IMAGE DATA FILE, AND COMPUTER PROGRAM

BACKGROUND

1. Technical Field

The present invention relates to a technology for selecting an image data file from a plurality of image data files.

2. Related Art

There are known technologies for automatically selecting an image data file to be printed among image data files of a plurality of images. For example, in the related art, an image that satisfies selection conditions, such as a degree of underexposure/overexposure, a degree of out-of-focus, and a degree of camera-shake, is selected. JP-A-2004-236120 is an example of this technology.

However, a user does not always perform photographing for the purpose of taking an image having a clear contour of a subject in a standard exposure state. For this reason, in the above-described technology, when the user intentionally takes the following images, the images are not selected as an object to be printed. For example, an image that the user intentionally wants to be overexposed or underexposed is not selected as an object to be printed. Further, when the user intentionally takes an image with a low shutter speed, an image having an unclear contour of the subject is not selected as an object to be printed.

The user usually wants to print an image that is taken under photographing conditions according to his/her own intention. Accordingly, in the related art, the selection result of the image data file to be printed does not sufficiently follow the user's desire. This problem occurs when image data to be processed among a plurality of image data is selected, as well as a case where image data to be printed is selected.

SUMMARY

An advantage of some aspects of the invention is that it provides a technology for automatically selecting an image data file from image data files of a plurality of images according to a user's intention.

According to a first aspect of the invention, when image represented by candidate image data files to be printed among a plurality of image data files are selected and output, the following processing is performed. First, a plurality of image data files, each having image data regarding an image, and additional data regarding at least a photographing condition when the image was taken, are selected. Then, among the plurality of image data files, image data files, which have additional data, not image data, satisfying one of one or more predetermined selection conditions, are selected as the candidate image data files to be output. Thereafter, the images represented by at least some of the candidate image data files are output.

With this configuration, image data files that are not selected as candidate image data files to be output in a processing based on image data can be selected as candidate image data files to be output on the basis of a photographing condition. For this reason, when image data files are automatically selected from image data files of a plurality of images, the selection can be performed according to the user's intention.

The additional data may include photographing time data regarding a photographing time of the image, and selection criterion data regarding some of the photographing conditions different from the photographing time. In this case, at least one of the selection conditions for selecting the candidate image data files to be output may partially include the following condition. The condition is that the selection criterion data of a first image data file to be examined represents some of the photographing conditions different from the selection criterion data of a second image data file having a sequence of the photographing time immediately before the first image data file among the plurality of image data files.

With this configuration, the image data files of the images taken when the user manually changes some of the photographing conditions from the previous setting as the candidate image data files to be output. Moreover, one of the selection conditions may further include a subordinate condition. In addition, the sequence of the photographing time is a sequence in which an image data file having a shorter photographing time is superior.

The selection criterion data may be data regarding a mode related to a predetermined operation when the image was taken in a photographing apparatus for taking images and generating image data files, the data regarding one of a plurality of modes including a first mode to be intentionally set by a user and a second mode set when the mode related to the predetermined operation is not set by the user.

At least one of the selection conditions for selecting the candidate image data files to be output may partially include the following subordinate condition. The subordinate condition is a condition that the selection criterion data of the first image data file is data regarding the first mode and the selection criterion data of the second image data file is data regarding the second mode.

With this configuration, the image data files of the images taken when the user intentionally sets a mode from a state where an operation mode is assigned can be set as the candidate image data files to be output.

The selection criterion data may be exposure data regarding a mode related to an exposure in a photographing apparatus for taking images and generating image data files. The exposure data may be data regarding one of a plurality of modes including an exposure preference mode, a shutter preference mode, and a normal mode to be selected when the mode related to the exposure is not assigned by the user.

At least one of the selection conditions for selecting the candidate image data files to be output may partially include the following subordinate condition. The subordinate condition is a condition that the exposure data of the first image data file is data regarding the exposure preference mode or the shutter preference mode and the exposure data of the second image data file is data regarding the normal mode.

With this configuration, the image data files of the images taken when the user manually changes the setting of an exposure program in the photographing apparatus from the normal mode to the exposure preference mode or the shutter preference mode can be selected as the candidate image data files to be output.

The selection criterion data may be photographing scene data regarding a mode related to a photographing scene in a photographing apparatus for taking images and generating image data files. The photographing scene data may be data regarding one of a plurality of modes including a night scene mode and a standard mode to be selected when the mode related to the photographing scene is not assigned by the user.

At least one of the selection conditions for selecting the candidate image data files to be output may partially include the following subordinate condition. The subordinate condition is a condition that the photographing scene data of the first image data file is data regarding the night scene mode and the photographing scene data of the second image data file is data regarding the standard mode.

With this configuration, the image data files of the images taken when the user manually changes the setting of the photographing apparatus from the standard mode to the night scene mode can be selected as the candidate image data files to be output.

The selection criterion data may be subject distance range data regarding a mode related to a distance to a subject in a photographing apparatus for taking images and generating image data files. The subject distance range data may be data regarding one of a plurality of modes including a macro mode and an unknown mode to be selected when the mode related to the distance to the subject is not assigned by the user.

At least one of the selection conditions for selecting the candidate image data files to be output may partially include the following subordinate condition. The subordinate condition is a condition that the subject distance range data of the first image data file is data regarding the macro mode and the subject distance range data of the second image data file is data regarding the unknown mode.

With this configuration, the image data file of the images taken when the user manually changes the setting relative to the distance of the photographing apparatus to the subject from the unknown mode to the macro mode can be selected as the candidate image data files to be output.

The selection criterion data may be flash data regarding a mode related to a flash in a photographing apparatus for taking images and generating image data files. The flash data may be data regarding one of a plurality of modes including a flash use mode, in which the flash is compulsorily turned on, a flash prohibition mode, in which the turning on of the flash is compulsorily prohibited, and an auto mode to be selected when the mode related to the flash is not assigned by the user.

At least one of the selection conditions for selecting the candidate image data files to be output may partially include the following subordinate condition. The subordinate condition is a condition that the flash data of the first image data file is data regarding the flash use mode or the flash prohibition mode and the flash data of the second image data file is data regarding the auto mode.

With this configuration, the image data files of the images taken when the user manually changes the setting relative to the flash in a photographing apparatus from the auto mode to the flash use mode or the flash prohibition mode can be selected as the candidate image data files to be output.

The selection criterion data may be exposure bias value data regarding an exposure bias value in a photographing apparatus for taking images and generating image data files.

At least one of the selection conditions for selecting the candidate image data files to be output may partially include the following subordinate condition. The subordinate condition is a condition that the exposure bias value data of the first image data file is data regarding a positive or negative exposure bias value other than 0 and the exposure bias value data of the second image data file is data regarding an exposure bias value of 0.

With this configuration, the image data files of the images taken when the user manually changes the setting from a state where an exposure bias of a photographing apparatus is not performed to a state where the exposure bias is performed can be selected as the candidate image data files to be output.

After the candidate image data files are selected, the images of the image data file selected as the candidate image data files may be displayed on a display unit display unit so as to request the user to select the image data files to be output.

With this configuration, the user can manually select the images to output on the basis of the automatically selected image data files and can output the images with small load.

Prior to display of the images, the candidate image data files to be output among the plurality of image data files may be selected on the basis of at least the image data. Further, when the images are displayed so as to request the user to select the image data files to be output, the following processing may be performed. That is, the images of the candidate image data files having the additional data satisfying the selection conditions are display together with a predetermined mark, and the candidate image data files selected as the image data are displayed without the mark. With this configuration, the user can easily select the image data files to output on the basis of the marks attached to the images.

At least one of the selection conditions for selecting the candidate image data files to be output may partially include the following subordinate condition. The subordinate condition may be data regarding some of the photographing conditions, and it may partially include a condition that the additional data includes data regarding some of the photographing conditions to be intentionally set by a user in a photographing apparatus for taking images and generating image data files. With this configuration, the image data of the image taken when the user performs intentional setting can be selected as the candidate image data files to be output.

Moreover, the invention can be implemented by various aspects, for example, a printing method and a printing apparatus, a method and apparatus for selecting an image data file, a method and apparatus for processing an image data file, an image output method and an image output apparatus, a computer program that implements each method or the functions of each apparatus, a recording medium having recorded thereon the computer program, and a data signal that is implemented in a carrier wave including the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
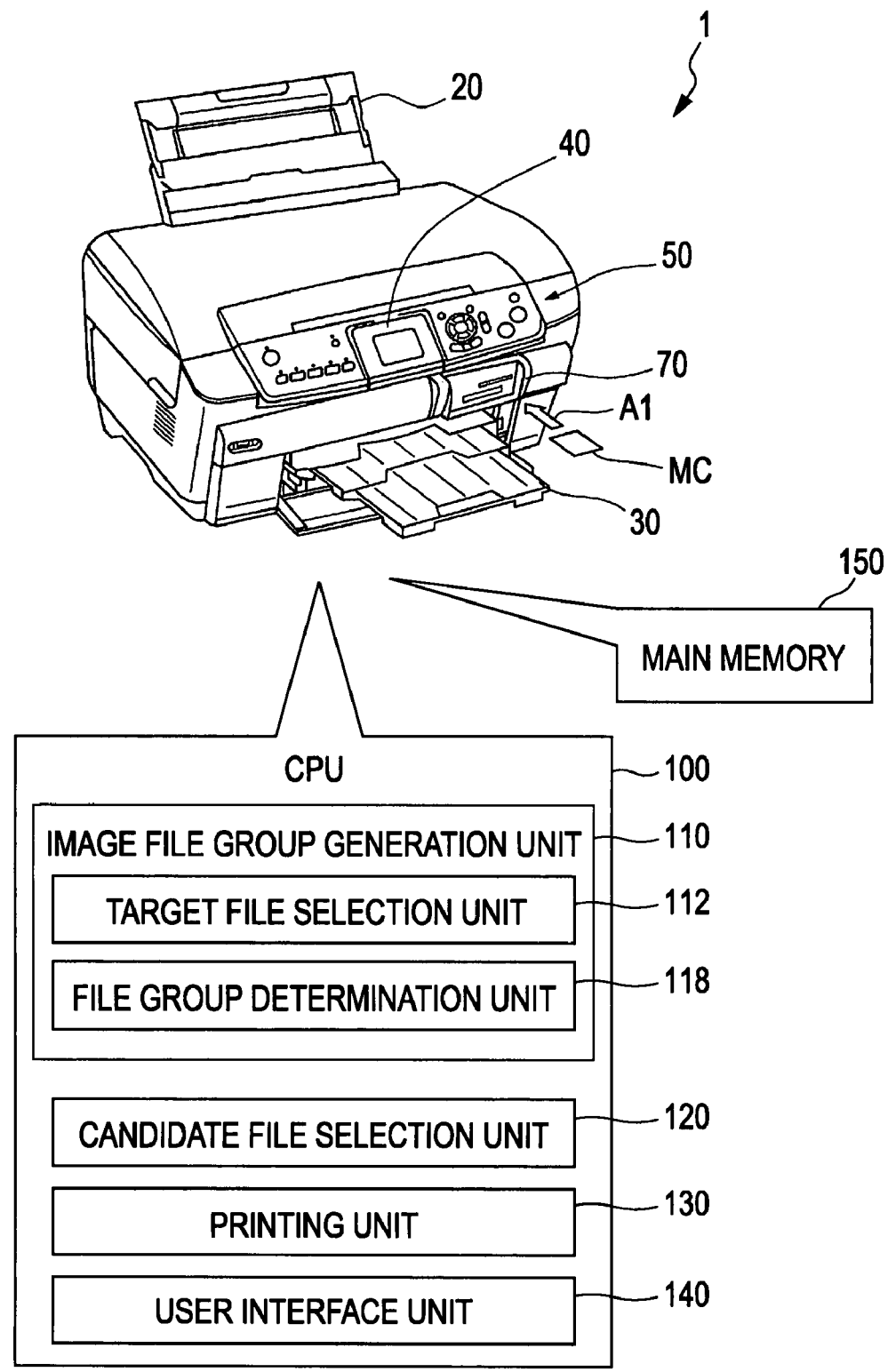
FIG. 1 is a perspective view showing a printer 1 according to an embodiment of the invention.

FIG. 1 is a perspective view showing a printer 1 according to an embodiment of the invention. The printer 1 is a printer that can perform printing on the basis of an image data file separately stored in a storage medium, but which is not connected to an external computer. The printer 1 includes a printing head (not shown) that ejects ink droplets and performs printing, an auto sheet feeder 20 that feeds a print sheet, a sheet discharge tray 30 that receives the print sheet, on which an image is to be printed, a liquid crystal display 40, a button group 50 that performs various operations, a card slot 70 into which a memory card can be inserted for data reading, a CPU 100, and a main memory 150. Moreover, in FIG. 1, for ease of understanding, the CPU 100 and the main memory 150 are shown outside the printer 1.

A memory card MC, such as compact flash™ card, SD card, mini SD card, memory stick, or smart media card, may be inserted directly into the card slot 70 or may be inserted into the card slot 70 through an adapter (see an arrow A1 shown in FIG. 1). Then, the CPU 100 can acquire a plurality of image data files stored in the memory card MC through the card slot 70.

Figure 2:
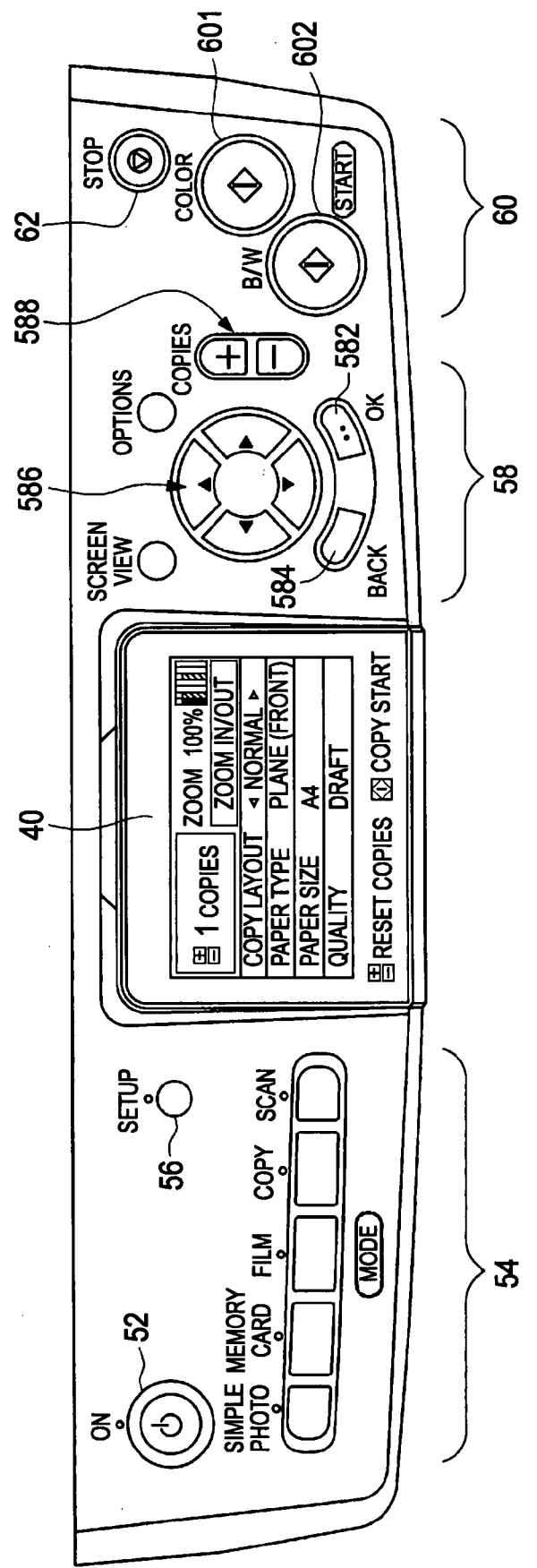
FIG. 2 is a plan view showing a liquid crystal display 40 and an operation panel having a button group 50 on magnified scale.

FIG. 2 is a plan view showing a liquid crystal display 40 and an operation panel having a button group 50 on a magnified scale. At the center of the operation panel, a 2.5" liquid crystal display 40 is provided. The liquid crystal display 40 can display a color image. The liquid crystal display 40 can display, for example, the images of the image data files stored in the memory card MC. Further, the liquid crystal display 40 can display, for example, information representing the state of the printer 1 or an operation menu that is used when a user inputs an instruction to the printer 1 through the button group 50.

on both sides of the liquid crystal display 40, buttons 52 to 62 for various operations are provided. These buttons are collectively referred to as the button group 50. The On button 52 is a button that is used for turning the power of the printer 1 on or off. A mode button group 54 includes a plurality of buttons, through which the user switches the operation mode of the printer. One button corresponds to one operation mode. The setting button 56 is a button that is used to set the maintenance of the printer 1 or the operation of each mode.

A menu button group 58 includes a plurality of buttons that are used for operating various numeric values or icons displayed on the liquid crystal display 40. A start button group 60 includes two buttons 601 and 602 that are used for selecting color print or monochrome print. The buttons 601 and 602 correspond to color print and monochrome (B/W) print, respectively. A stop button 62 is a button that is used for stopping an operation being executed by the printer 1.

The menu button group 58 includes an OK button 582 for performing an input confirming that the setting contents presented on the liquid crystal display 40 are as desired, a back button 584 for displaying the contents displayed on liquid crystal display 40 before a previous step, a selection button group 586 having four buttons for selecting one of a plurality of icons or menus displayed on the liquid crystal display 40, and a copies button group 588 for setting the number of copies to be printed. With the button group, even in the printer 1 having a comparatively small display, the user can easily select one image data file stored in the memory card and perform printing.

Figure 3:
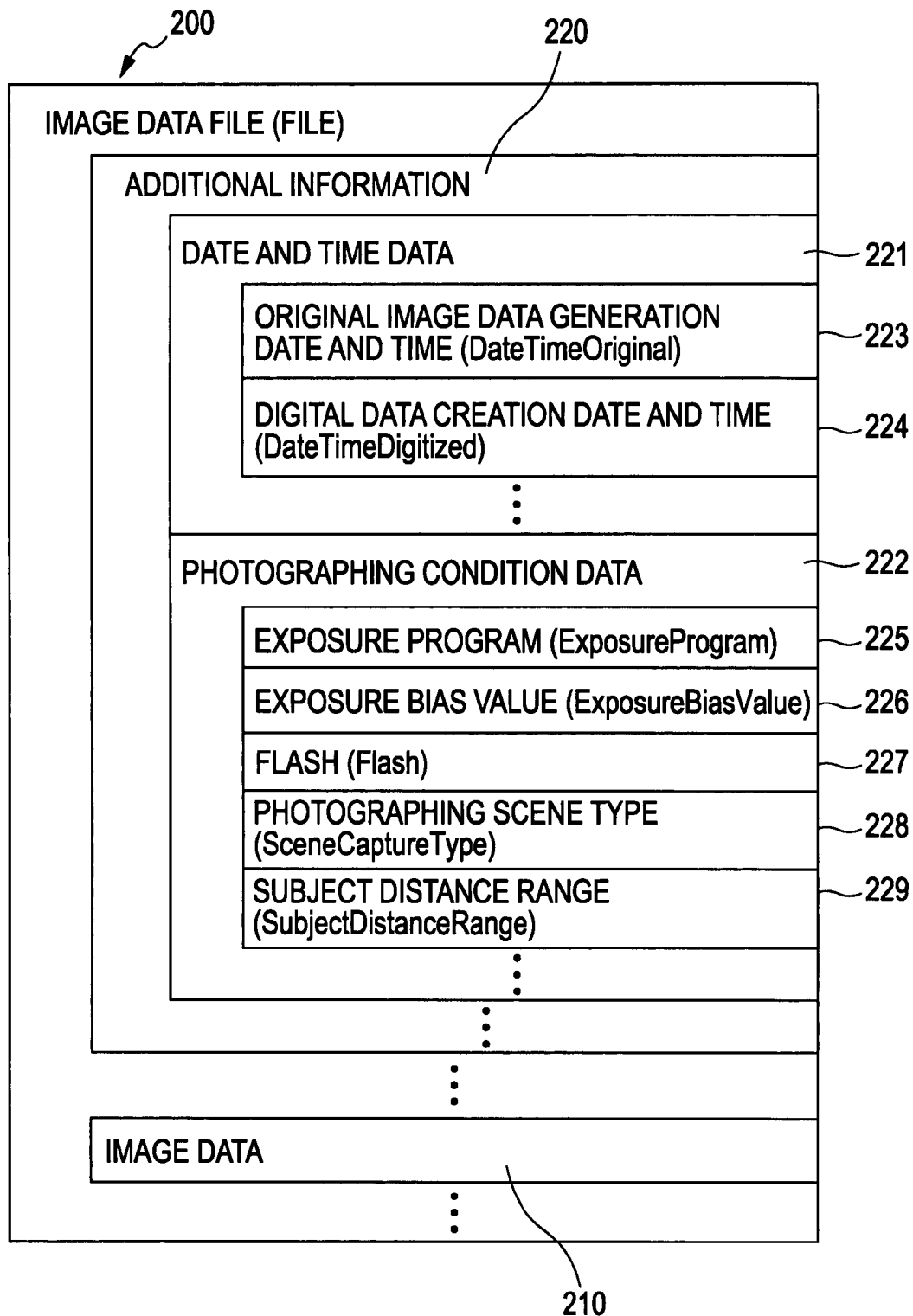
FIG. 3 is a diagram showing the structure of an image data file based on a standard of Exif version 2.2.

FIG. 3 is a diagram showing the structure of an image data file 200 based on a standard of Exif version 2.2. The image data file 200 based on the standard of Exif version 2.2 has image data 210 and additional information data 220. The image data 210 represents the content of the image. The additional information data 220 has information about date and time and information about a photographing condition.

The additional information data 220 is recorded in a header portion of the image data file in a tag format. That is, the additional information data 220 is recorded in a format of a two-byte value called 'tag' and the data is stored in an area subsequent to the tag. The data is identified by the 'tag'. In FIG. 3, data of a portion in the header portion of the image data file 200 where the information about date and time is recorded is collectively referred to as 'date and time data 221', and data of a portion where the information about the photographing condition is recorded is collectively referred to as 'photographing condition data 222'.

The image data file 200 has 'original image data generation date and time (DateTimeoriginal)' data and 'digital data creation date and time (DateTimeDigitized)' data as 'date and time data 221'. In this specification, 'original image data generation date and time data' is simply referred to as 'original image data generation date and time'. Further, 'digital data creation date and time data' is simply referred to as 'digital data creation date and time'. Similar abbreviations are used for other data.

In the image data file 200, 'original image data generation date and time' 223 represents the date and time when an image was taken. 'Digital data creation date and time' 224 represents the date and time when the image of the image is digitized. 'Digital data creation date and time' 224 is originally the same as the 'original image data generation date and time' 223. 'Original image data generation date and time' 223 and 'digital data creation date and time' 224 all are recorded in a format of year, month, day, hours, minutes, and seconds.

The image data file 200 has 'exposure program (ExposureProgram)' data, 'exposure bias value (ExposureBiasvalue)' data, 'flash (Flash)' data, 'photographing scene type (SceneCaptureType)' data, and 'subject distance range (SubjectDistanceRange)' data as the 'photographing condition data 222'.

'Exposure program (ExposureProgram)' 225 contains data regarding an exposure program mode that was previously set for photographing in the digital still camera that generated the image data file. In 'exposure program' 225, data regarding a mode, such as 'manual', 'normal program', 'exposure preference', or 'shutter preference', is selectively stored.

'Manual' represents an operation mode in which the user manually sets both an aperture (exposure) and a shutter speed. 'Normal program' is a default mode that is set when an operation mode related to the exposure program other than 'normal program' has not been assigned by the user. The modes other than the 'normal program' mode are intentionally set by the user.

In the 'normal program' mode, the digital still camera as a photographing apparatus is configured to automatically set both the aperture (exposure) and the shutter speed. In the 'exposure preference' mode, the user sets the aperture, and the digital still camera is configured to automatically set the shutter speed according to the aperture. In the 'shutter preference' mode, the user sets the shutter speed, and the digital still camera is configured to automatically set the aperture according to the shutter speed.

'Exposure bias value (ExposureBiasValue)' 226 contains data regarding an exposure bias value (EV value) mode that was previously set for photographing in the digital still camera that generated the image data file. An exposure bias value of 0 (zero) represents a state where a bias is not performed.

'Flash (Flash)' 227 contains data regarding a mode related to use of a flash, that was previously set for photographing in the digital still camera that generated the image data file. In 'flash' 227, data regarding a mode, such as 'unknown', 'compulsory flash', 'flash prohibition', or 'auto mode', is selectively stored.

'Auto mode' is a mode that is automatically set by the digital still camera when an operation mode for the flash is not assigned by the user. In this case, according to the brightness of the surrounding environment when the image was taken, the digital still camera automatically determines whether or not to turn on the flash. If the digital still camera cannot functionally detect the operation of the flash, 'flash' 227 may be 'unknown'. The modes other than 'auto mode' and 'known' are intentionally set by the user.

'Photographing scene type (SceneCaptureType)' 228 contains data regarding a mode related to a photographing scene, that was previously set when the image was taken. In 'photographing scene type' 228, data regarding a mode, such as 'standard', 'scene', 'character', or 'night scene', is selectively stored. 'Standard' is an operation mode that is automatically set by the digital still camera when setting of the photographing scene is not assigned by the user. The modes other than 'standard' are intentionally set by the user.

'Subject distance range (SubjectDistanceRange)' 229 contains data regarding a mode related to a distance to a subject, that was previously set. In 'subject distance range' 229, data regarding a mode, such as 'unknown', 'macro', 'near view', or 'distant view', is selectively stored.

The 'distant view' mode is a mode that is used when a distant scene is photographed. The 'near view' mode is a mode that is used when a near scene is photographed. The 'macro' mode is a mode that is used when, for example, a flower, an insect, or an object placed on a table is photographed, that is, when photographing is performed at a close position of several cm or tens of cm from a subject. The 'unknown' mode is a mode that is automatically set by the digital still camera when an operation mode related to 'subject distance range' is not assigned by the user. The modes other than 'unknown' are intentionally set by the user.

According to the printing apparatus of this embodiment, in an 'auto select print' processing described below, image data files to be printed are selected on the basis of both the image data 210 and the additional information data 220 described above.

Figure 4:
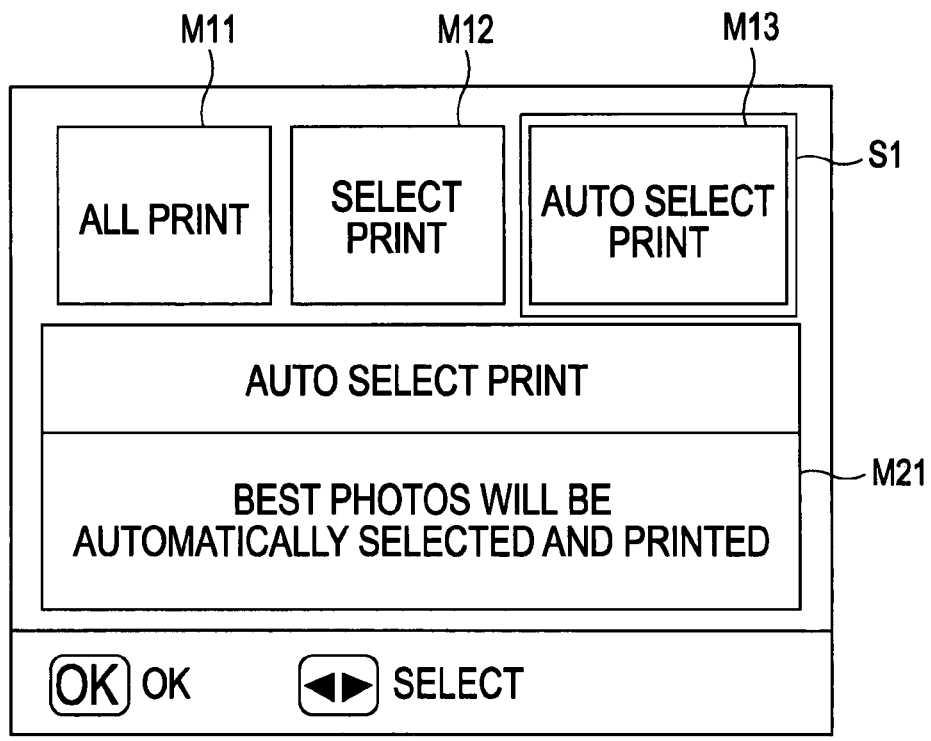
FIG. 4 is a diagram showing display performed by the liquid crystal display 40 when a 'memory card' button of a mode button group 54 is pushed.

FIG. 4 is a diagram showing display performed by the liquid crystal display 40 when the memory card MC storing the image data files 200 is inserted in the card slot 70 of the printer 1 (see arrow A1 shown in FIG. 1) and the 'memory card' button (see FIG. 2) in the mode button group 54 is pushed. Moreover, the image data files stored in the memory card MC are the image data files 200 based on Exif version 2.2. In FIG. 4, in an upper portion of the liquid crystal display 40, three kinds of menus, namely, 'all print' M11, 'select print' M12, and 'auto select print' M13 are displayed. The 'auto select print' menu M13 is surrounded by a frame S1. The state shown in FIG. 4 is a state where 'auto select print' M13 is temporarily selected.

In a lower portion of the liquid crystal display 40, a display M21 that describes the content of the 'auto select print' processing temporarily selected at that time is displayed. The 'auto select print' is a processing in which the printing apparatus automatically selects and prints images represented by image data files among a plurality of image data files stored in the memory card. When display as shown in FIG. 4 is performed by the liquid crystal display 40, if the user operates the selection button group 586 (see FIG. 2), the content of one of 'all print' M11, 'select print' M12, and 'auto select print' M13 of the upper portion is displayed in the lower portion of the liquid crystal display 40.

Figure 5:
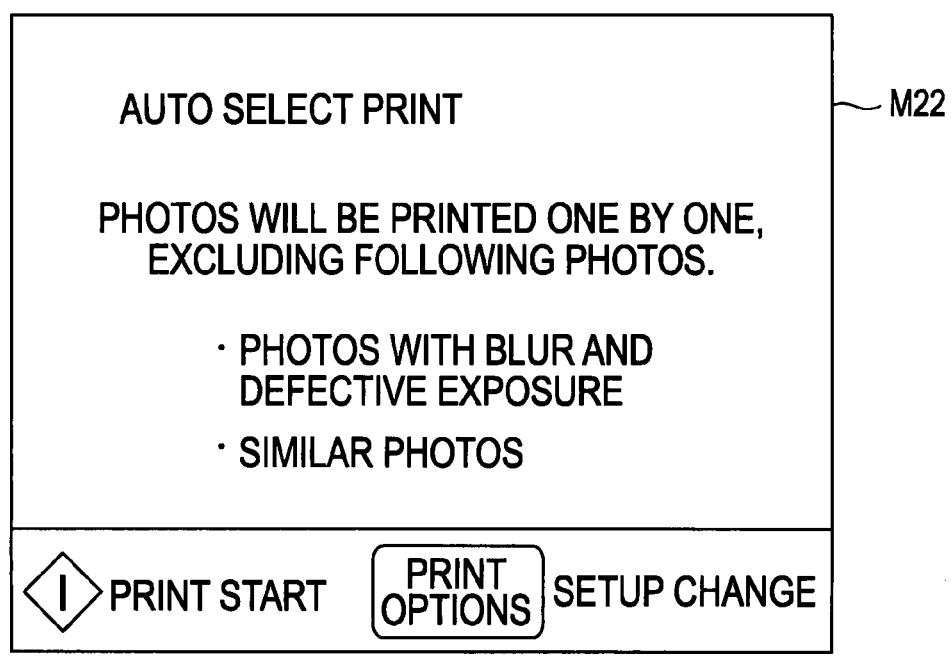
FIG. 5 is a diagram showing display performed by the liquid crystal display 40 after an OK button 582 is pushed when display as shown in FIG. 4 is performed by the liquid crystal display 40.

FIG. 5 is a diagram showing display performed by the liquid crystal display 40 after the OK button 582 (see FIG. 2) is pushed when display as shown in FIG. 4 is performed by the liquid crystal display 40. The detailed description M22 of the 'auto select print' processing is displayed on the liquid crystal display 40. In the 'auto select print' mode, some image data files among a group of image data files of the memory card MC are selected. Then, the images are selected and printed one by one on the basis of the selected image data files. Moreover, in the 'auto select print' images represented by the image data files having a blurred contour different from a predetermined level or images having a level of underexposure or overexposure different from a predetermined level are not printed.

When display as shown in FIG. 5 is performed by the liquid crystal display 40, if the color print button 601 of the start button group 60 (see FIG. 2) is pushed, the images represented by the image data files automatically selected by the printing apparatus among the plurality of image data files stored in the memory card are printed in color. Moreover, if the monochrome (B/W) print button 602 is pushed, similarly, images represented by the image data files automatically selected by the printing apparatus are printed in monochrome.

Figure 6:
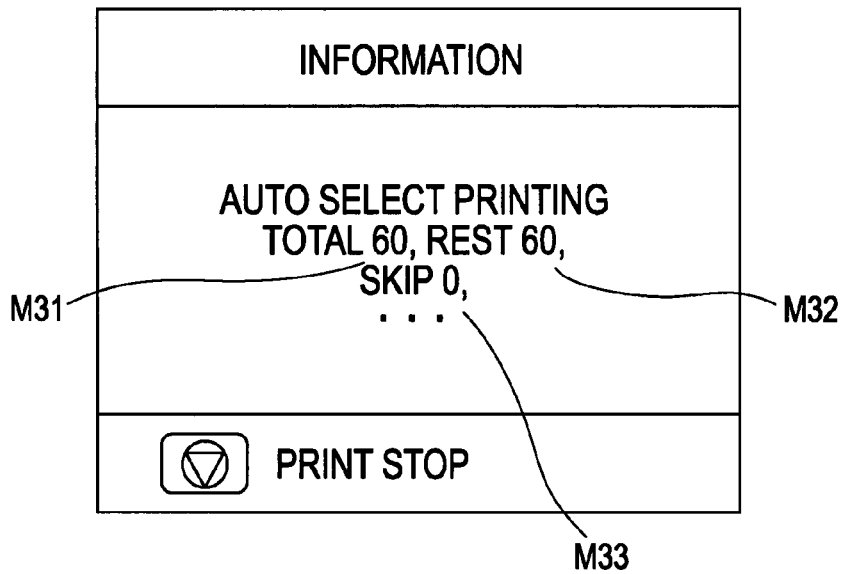
FIG. 6 is a diagram showing display performed by the liquid crystal display 40 after a color print button 601 or a monochrome print button 602 is pushed when display as shown in FIG. 5 is performed by the liquid crystal display 40.

FIG. 6 is a diagram showing display performed by the liquid crystal display 40 after the color print button 601 or the monochrome (B/W) print button 602 is pushed by the user in a state where the display as shown in FIG. 5 is performed by the liquid crystal display 40. The number M31 of image data files stored in the memory card MC is displayed as 'total'. Here, a case is shown where the number of image data files stored in the memory card is 60. As images represented by the image data files in the memory card are printed, the number M32 displayed as 'rest' decreases.

Images represented by the image data files, which are not selected as the object to be printed, among a group of image data files of the image having defective exposure or an unclear image contour or image data files having similar images are not printed. As the 'auto select print' processing progresses, the number of image data files that are determined not to be printed increases, and thus the number M33 displayed on the liquid crystal display 40 as 'skip' increases.

Moreover, a functional part of the CPU 100 that displays the user interface screens shown in FIGS. 4 to 6 and requests the user to input an instruction is shown in FIG. 1 as a user interface unit 140.

Figure 7:
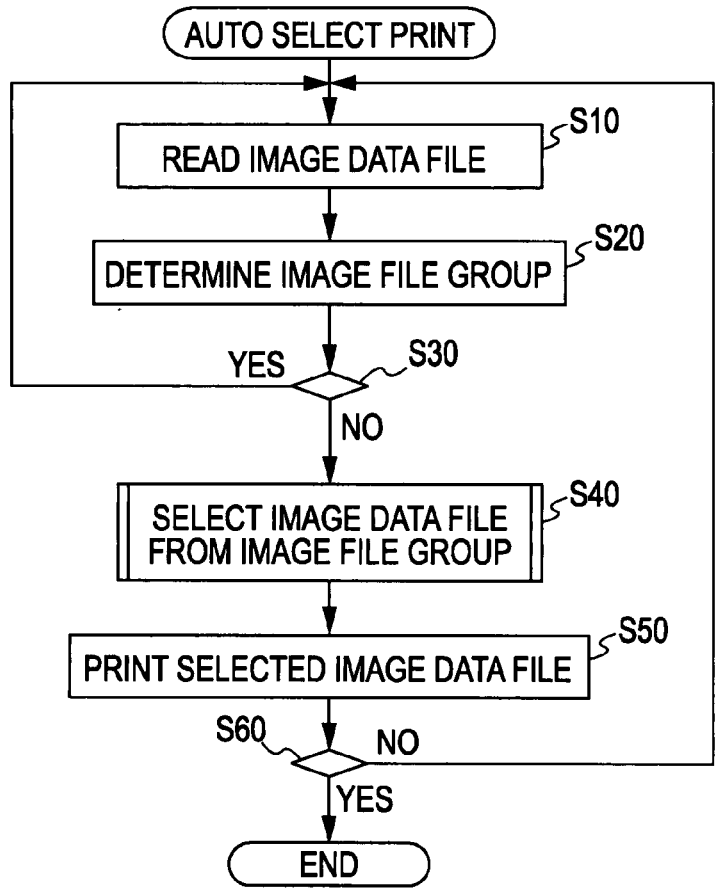
FIG. 7 is a flowchart showing the contents of an 'auto select print' processing.

FIG. 7 is a flowchart showing the content of the 'auto select print' processing. FIG. 7 shows a processing that is executed by the CPU 100 after the color print button 601 or the monochrome (B/W) print button 602 is pushed when display as shown in FIG. 5 is performed by the liquid crystal display 40.

At Step S10, the CPU 100 reads out the image data files from the memory card to the main memory 150. In a case when the processing of Step S10 is executed for the first time, two image data files having the shortest photographing time among the image data files of the memory card are read out. The CPU 100 can determine the photographing time on the basis of the 'original image data generation date and time' data 223 (see FIG. 3) in each image data file 200. A functional part of the CPU 100 that executes the processing of Step S10 is shown in FIG. 1 as a target file selection unit 112.

At Step S20, it is determined whether or not the two read image data files belong to the same image file group. When the processing of Step S10 is executed for the first time, a first group is automatically allocated to the image data file having the shortest photographing time. At Step S20, on the basis of the image data 210 and the additional information data 220 (see FIG. 3) of each image data file 200, it is judged whether or not two image data files having photographing times such that a difference therebetween is within a predetermined range and images having a level of similarity equal to or higher than a predetermined level belong to the same image file group.

When it is determined that the two read image data files belong to the same image file group, the group to which the image data file having a short photographing time belongs is allocated to the image data file having a long photographing time. Meanwhile, when it is determined that the two read image data files do not belong to the same image file group, a next image file group is allocated to the image data file having a long photographing time.

For example, when the processing of Step S20 is executed for the first time, and it is determined that two image data files do not belong to the same image file group, an image file group is allocated as follows. That is, a first image file group is allocated to the image data file having a short photographing time. Then, a second image file group is allocated to the image data file having a long photographing time.

As such, if it is determined that the different in photographing times is within a predetermined range, and the two image data files having similar images belong to the same image file group, the following effects are obtained. That is, from a viewpoint that the user takes a plurality of similar images, a plurality of images that are continuously taken for short time can be classified in the same group.

Since the image file group is determined through the comparison of only the two image data files, an image file group to which each image data file belongs can be determined with a small main memory, compared with a case where three or more image data files are read to determine the image file groups. A functional part of the CPU 100 that executes the processing of Step S20 is shown in FIG. 1 as a file group determination unit 118.

At Step S30 shown in FIG. 7, the processing can take one of two directions according to whether or not the two image data files belong to the same image file group. At Step S20, if it is determined that the two image data files belong to the same image file group, the processing returns to Step S10. At Step S20, if it is determined that the two image data files do not belong to the same image file group, the processing progresses to Step S40.

When the processing returns from Step S30 to Step S10 again, at Step S10, the image data file having the shorter photographing time among the two previously read image data files is discharged from the main memory 150. Then, an image data file having the shortest photographing time among the image data files not allocated to the corresponding image file group in the memory card is read to the main memory 150. Then, at Step S20, it is determined whether or not the two image data files belong to the same image file group.

The image data files that are to be determined whether or not they belong to the same image file group at Step S20 include the following files: an image data file having the longest photographing time among the image data files correspondingly allocated to the image file groups and an image data file having the shortest photographing time among the image data files correspondingly allocated to the image file groups.

At Step S20, when it is determined that the two image data files do not belong to the same image file group, the processing branches off at Step S30 and progresses to Step S40. As a result of the processing, the image data files making up one image file group include all image data files from an image data file initially allocated to a new image file group to a last read image data file before an image data file read immediately before the processing progresses to Step S40. Through the processing of Steps S10 to S30, the image data files classified into one image file group are likely to be the image data files that the user considers as containing 'similar images'.

A functional part of the CPU that generates the image file group through the processing of Steps S10 to S30 is shown in FIG. 1 as an image file group generation unit 110. The target file selection unit 112 and the file group determination unit 118 form a part of the image file group generation unit 110.

At Step S40, the candidate image data files to be printed are selected from one image file group determined in the above-described manner. The processing of Step S40 will be described in detail.

At Step S50, images represented by the image data files selected as the image data files to be printed at Step S40 are printed. A functional part of the CPU 100 that executes such a processing is shown in FIG. 1 as a printing unit 130. Moreover, when no image data file in the image file group is selected as the image data file to be printed at Step S40, at Step S50, printing of the image data files is not performed. In addition, at Step S50, the number of 'rest' image data files and the number of 'skip' image data files in display as shown in FIG. 6 are updated.

Thereafter, at Step S60, it is judged whether or not the processing of Steps S40 and S50 is performed for all the image data files in the memory card. When the image data files that are examined to determine whether or not they are the image data files to be printed (Step S40) and for which printing is not performed exist in the memory card and display performed by the liquid crystal display 40 is not updated according to the examination result (Step S50), the processing returns to Step S10. Meanwhile, if the processing of Steps S40 and S50 has been performed for all the image data files in the memory card, the processing ends.

Figure 8:
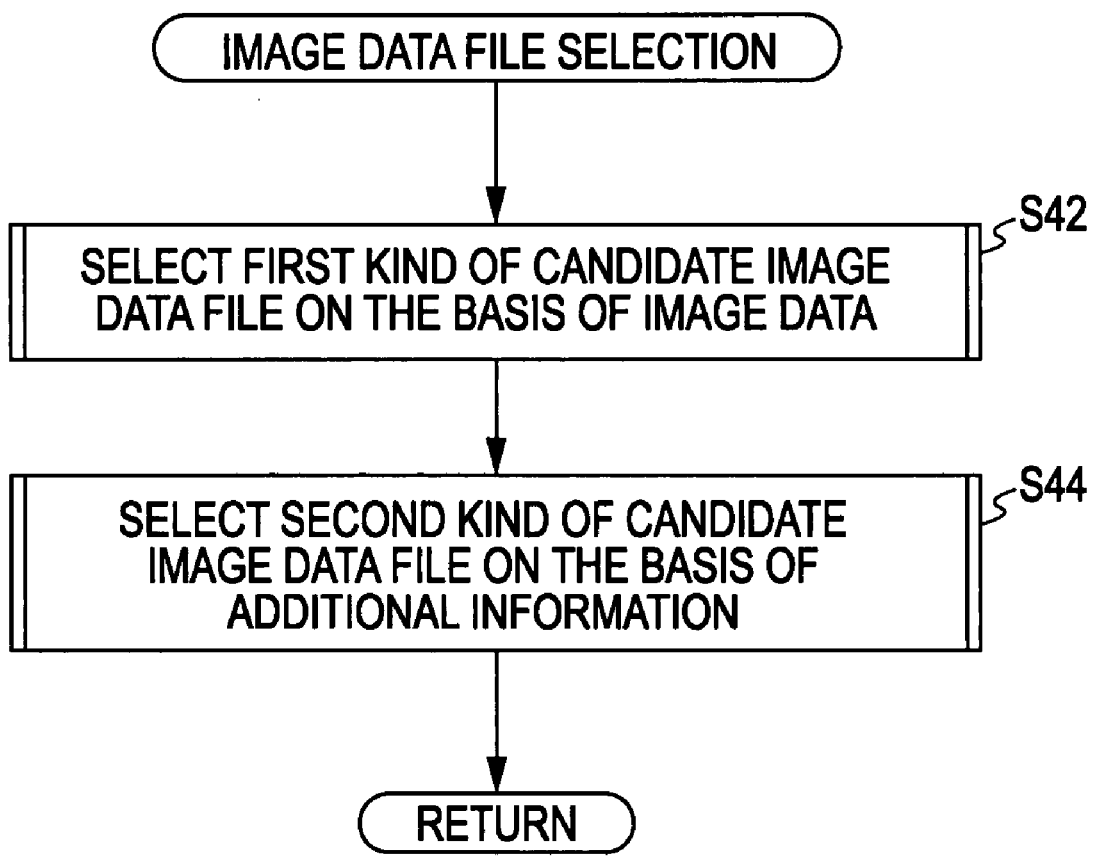
FIG. 8 is a flowchart showing a processing of selecting a candidate image data file to be printed from an image file group at Step S40 shown in FIG. 7.

FIG. 8 is a flowchart showing a processing of selecting the candidate image data files to be printed from the image file group at Step S40 shown in FIG. 7. At Step S42, one first candidate image data file is selected from one image file group on the basis of the image data 210.

Next, at Step S44 shown in FIG. 8, on the basis of the additional information data 220, a second candidate image data file is selected from one image file group. At Step S40 shown in FIG. 7, in the above-described manner, the one first candidate image data file selected on the basis of the image data 210 and the second candidate image data file selected on the basis of the additional information data 220 are selected as the image data files that are the candidate image data files to be printed. At Step S50 shown in FIG. 7, the images represented by the first and second candidate image data files selected in the above-described manner are printed.

Figure 9:
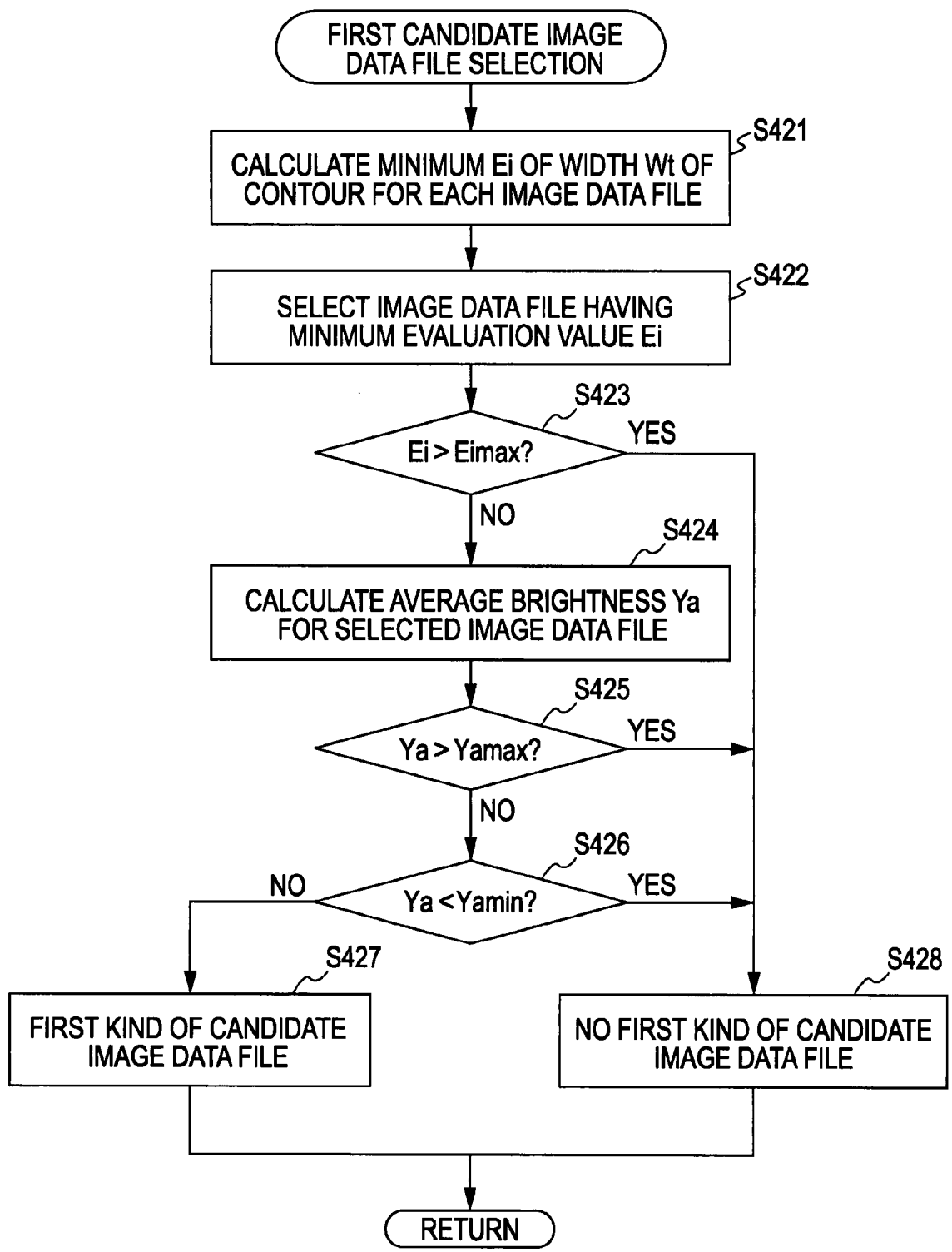
FIG. 9 is a flowchart showing a processing of selecting a first candidate image data file from an image file group at Step S42 shown in FIG. 8.

FIG. 9 is a flowchart showing a processing of selecting a first candidate image data file from an image file group at Step S42 shown in FIG. 8. The processing shown in FIG. 9 is executed for each image file group.

At Step S421, the contour line in the image of each image data file is extracted. The contour is a boundary between a color region and another region in the image. For this reason, in a portion of the contour in the image, brightness changes from one value to another value. At Step S421, a width Wt required for the transition is calculated as the width of the extracted contour line. Then, the minimum value of the width Wt of the contour line in the image of each image data file is set as an evaluation value Ei of the corresponding image data file. By determining the evaluation value Ei in such a manner, the evaluation value can be determined such that the image data file of an image, wherein a portion of the image is focused, is given a higher evaluation value, and the image data file of an image, wherein the entire image is not focused, is given a lower evaluation value.

At Step S422, the image data file having the smallest evaluation value Ei is selected from the image file group. With this processing, an image data file that is being examined as an object subject to the processing of Step S423 and subsequent steps and can be estimated as one having the clearest image contour and can be selected. Moreover, when the image file group includes one image data file, the one image data file is selected at Step S422.

At Step S423, it is judged whether or not the evaluation value Ei of the image data file selected at Step S422 exceeds a predetermined threshold value Eimax. If the judgment result is Yes, at Step S428, it is determined that the image data file corresponding to the first candidate image data file does not exist in the image file group that is being examined. If the judgment result is No, the processing progresses to Step S424.

The threshold value Eimax is a threshold value for judging whether or not the contour of the image is blurred. That is, for an image having the evaluation value Ei exceeding the threshold value Eimax, it can be estimated that the contour is blurred, that is, the image is out of focus. In this embodiment, the image data file of such an image is not set as the first candidate image data file to be printed. Accordingly, a defocused image determined as one that the user does not want to print can be excluded from the object to be printed in principle.

At Step S424, an average luminance level Ya of all pixels in the image of the image data file selected at Step S422 is calculated.

At Step S425, it is judged whether or not the average luminance level exceeds a first luminance threshold value Yamax. If the judgment result is Yes, the processing progresses to Step S428. Meanwhile, if the judgment result is No, the processing progresses to Step S426.

The first luminance threshold value Yamax is a threshold value for judging whether or not the image has been overexposed. That is, for an image having the average luminance level Ya of all the pixels thereof exceeding the first luminance threshold value Yamax, it can estimated that the image has been overexposed. In this embodiment, the image data file of such an image is not set as the first candidate image data file to be printed. Accordingly, an overexposed image to be estimated as one that the user does not want to print can be excluded from the object to be printed in principle.

At Step S426, it is judged whether or not the average luminance level is less than a second luminance threshold value Yamin. Moreover, the second luminance threshold value Yamin is a value smaller than the first luminance threshold value Yamax. At Step S426, when the judgment result is Yes, the processing progresses to Step S428.

The second luminance threshold value Yamin is a threshold value for judging whether or not the image is underexposed. That is, for an image having an average luminance level Ya of all the pixels thereof less than the second luminance threshold value Yamin, it can be estimated that the image is underexposed. In this embodiment, the image data file of such an image is not set as the first candidate image data file. Accordingly, an underexposed image determined as one that the user does not want to print can be excluded from the object to be printed in principle.

Meanwhile, at Step S426, when the judgment result is No, the processing progresses to Step S427. At Step S427, the image data file selected at Step S422 is determined as the first candidate image data file of the image file group that is being examined.

After Step S427 or S428, the processing of selecting the first candidate image data file ends (see Step S42 shown in FIG. 8).

With the processing shown in FIG. 9, the image data file having the clearest contour (see Step S422) among the image data files of the similar images can be selected as the first candidate image data file. Besides, the image data file selected as the first candidate image data file is the image data file of an image that has a clear contour different from a predetermined reference value (see Step S423), and not subject to overexposure or underexposure (see Steps S425 and S426). For this reason, with the processing shown in FIG. 9, the image data file that can be estimated to be well taken according to a normal criterion can be selected as the first candidate image data file on the basis of the content of the image data.

In addition, with the processing shown in FIG. 9, an image represented by the image data file that can be estimated to be not taken well according to the normal criterion is not printed. For this reason, in the 'auto select print' processing in which the printer 1 automatically selects the image data files, only the images represented by the image data files that can be estimated to be well taken can be printed in a short time. Further, the number of copies or ink can be saved.

A functional part of the CPU 100 that executes the above-described processing of selecting the first candidate image data file (see Step S42 shown in FIG. 8) is shown in FIG. 1 as a candidate file selection unit 120.

Figure 10:
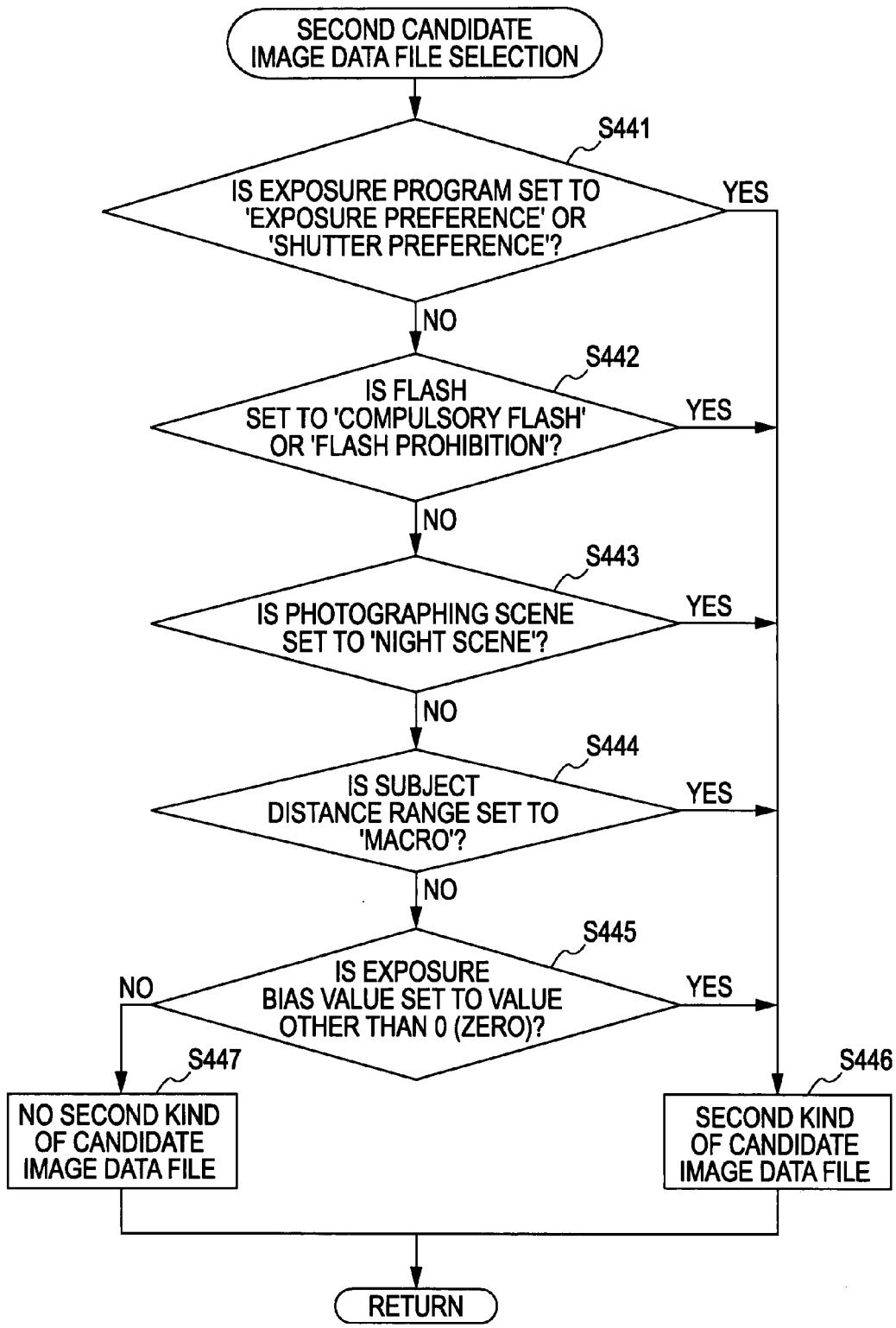
FIG. 10 is a flowchart showing a processing of selecting a second candidate image data file from an image file group at Step S44 shown in FIG. 8.

FIG. 10 is a flowchart showing a processing of selecting the second kind of candidate image data file from the image file group at Step S44 shown in FIG. 8. The processing shown in FIG. 10 is executed for each image data file in one image file group.

Hereinafter, an image data file, for which 'whether or not corresponds to the second candidate image data file' is being examined in the flow diagram shown in FIG. 10 is referred to as 'first image data file'. Then, an image data file that has a photographing time immediately before the first image data file among the plurality of image data files stored in the memory card MC is referred to as 'second image data file'. Moreover, the photographing time is stored as the 'original image data generation date and time' 223 (see FIG. 3) of each image data file 200.

At Step S441, it is judged whether or not the 'exposure program' 225 mode (see FIG. 3) in the additional information of the first image data file to be examined is 'exposure preference' or 'shutter preference', and whether or not the 'exposure program' 225 mode in the additional information of the previous second image data file is 'normal program'. When the judgment result is Yes, at Step S446, the image data file is determined to be the second candidate image data file. If the judgment result is No, the processing progresses to Step S442.

At Step S442, it is judged whether or not the 'flash' 227 mode (see FIG. 3) in the additional information of the first image data file to be examined is 'compulsory flash' or 'flash prohibition' and whether or not the 'flash' 227 mode in the additional information of the previous second image data file is 'auto mode'. When the judgment result is Yes, at Step S446, the image data file is determined to be the second candidate image data file. If the judgment result is No, the processing progresses to Step S443.

At Step S443, it is judged whether or not the 'photographing scene type' 228 mode (see FIG. 3) in the additional information of the first image data file to be examined is 'night scene', and whether or not the 'photographing scene type' 228 mode in the additional information of the previous second image data file is 'standard'. When the judgment result is Yes, at Step S446, the image data file is determined to be the second candidate image data file. If the judgment result is No, the processing progresses to Step S444.

At Step S444, it is judged whether or not the 'subject distance range' 229 mode (see FIG. 3) in the additional information of the first image data file to be examined is 'macro' and whether or not the 'subject distance range' 229 mode in the additional information of the previous second image data file is 'unknown'. When the judgment result is Yes, at Step S446, the image data file is determined to be the second candidate image data file. If the judgment result is No, the processing progresses to Step S445.

At Step S445, it is judged whether or not 'exposure bias value' 226 mode (see FIG. 3) in the additional information of the first image data file to be examined is a value (positive or negative) other than 0 (zero), and whether or not 'exposure bias value' 226 mode in the additional information of the previous second image data file is 0 (zero). When the judgment result is Yes, at Step S446, the image data file is determined to be the second candidate image data file. When the judgment result is No, at Step S447, the image data file is determined not to be the second candidate image data file.

After Step S446 or S447, the processing of selecting the second candidate image data file among the image file groups ends. The processing of selecting the second candidate image data file described above (see Step S44 shown in FIG. 8) is executed by a candidate file selection unit 120 as a functional part of the CPU 100.

In the processing shown in FIG. 10, the image data file that is determined as the second candidate image data file is an image data file when the digital still camera is set according to the user's intention. When such an image data file is set as the candidate image data file to be printed, the following effects are obtained.

For the image data file of an image taken when the user changes the setting of the digital still camera upon photographing, the following estimation is established. That is, even in a case of an image represented by an image data file having a brightness level lower than a predetermined reference level, an image represented by an image data file having a brightness level higher than a predetermined reference level, or an image represented by an image data file having a contour blurred more than a predetermined reference level (see Steps S423, S425, and S426 shown in FIG. 9), it can be estimated that the user intentionally takes such an image. In such a case, the user wants such an image to be printed in an auto print mode, such as 'auto select print'.

However, in selecting the first candidate image data file, such image data files, that is, an image data file of an image having an average luminance level exceeding a first predetermined value, an image data file of an image having the average luminance level not reaching a second predetermined value, and an image data file of an image having an evaluation value Ei about the contour exceeding a predetermined value are not selected (see Steps S423, S425, and S426 shown in FIG. 9).

In this embodiment, for the image data file when the digital still camera is set according to the user's intention, the initial image data file when such a setting is made is selected as the second candidate image data file. Accordingly, in addition to the first candidate image data file that can be estimated to be well taken according to the normal criterion (see Step S42 shown in FIGS. 8 9), the second candidate image data file to be estimated as one that the user intentionally photographs and wants to print can be set as the object to be printed (see Step S44 shown in FIGS. 8 and 10). For this reason, according to the 'auto select print' processing of the printing apparatus of this embodiment, the image data files according to the user's intention can be selected.

Second Embodiment

In the first embodiment, an image represented by the candidate image data file selected at Step S40 shown in FIG. 7 is printed at Step S50. In contrast, in the second embodiment, after Step S40 shown in FIG. 7 and before Step S50, a processing that is not executed in the first embodiment is executed. The processing is a processing that adds and deletes an image data file, which the user wants to print, to and from the candidate image data files selected at Step S40. At Step S50, printing of a corrected collection of the image data files is performed. Other parts of the second embodiment are the same as those in the first embodiment.

Figure 11:
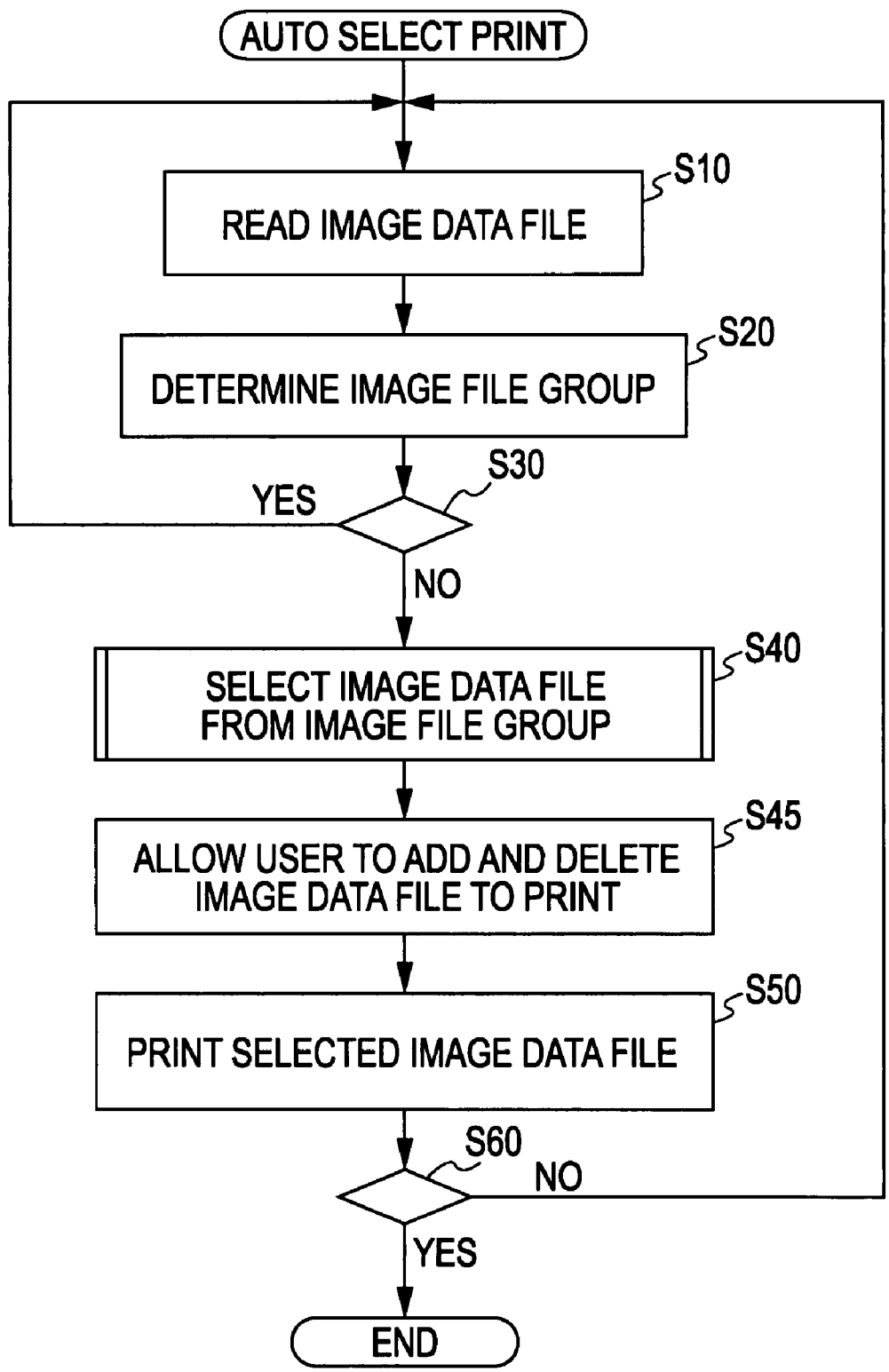
FIG. 11 is a flowchart showing the contents of an 'auto select print' processing according to a second embodiment of the invention.

FIG. 11 is a flowchart showing the content of the 'auto select print' processing in the second embodiment. The flowchart shown in FIG. 11 is the same as the flowchart shown in FIG. 7, excluding that Step S45 is added. After the candidates image data files to be printed are selected at Step S40, at Step S45, the images of the image data files in the memory card MC are displayed on the liquid crystal display 40 16 at a time.

Figure 12:
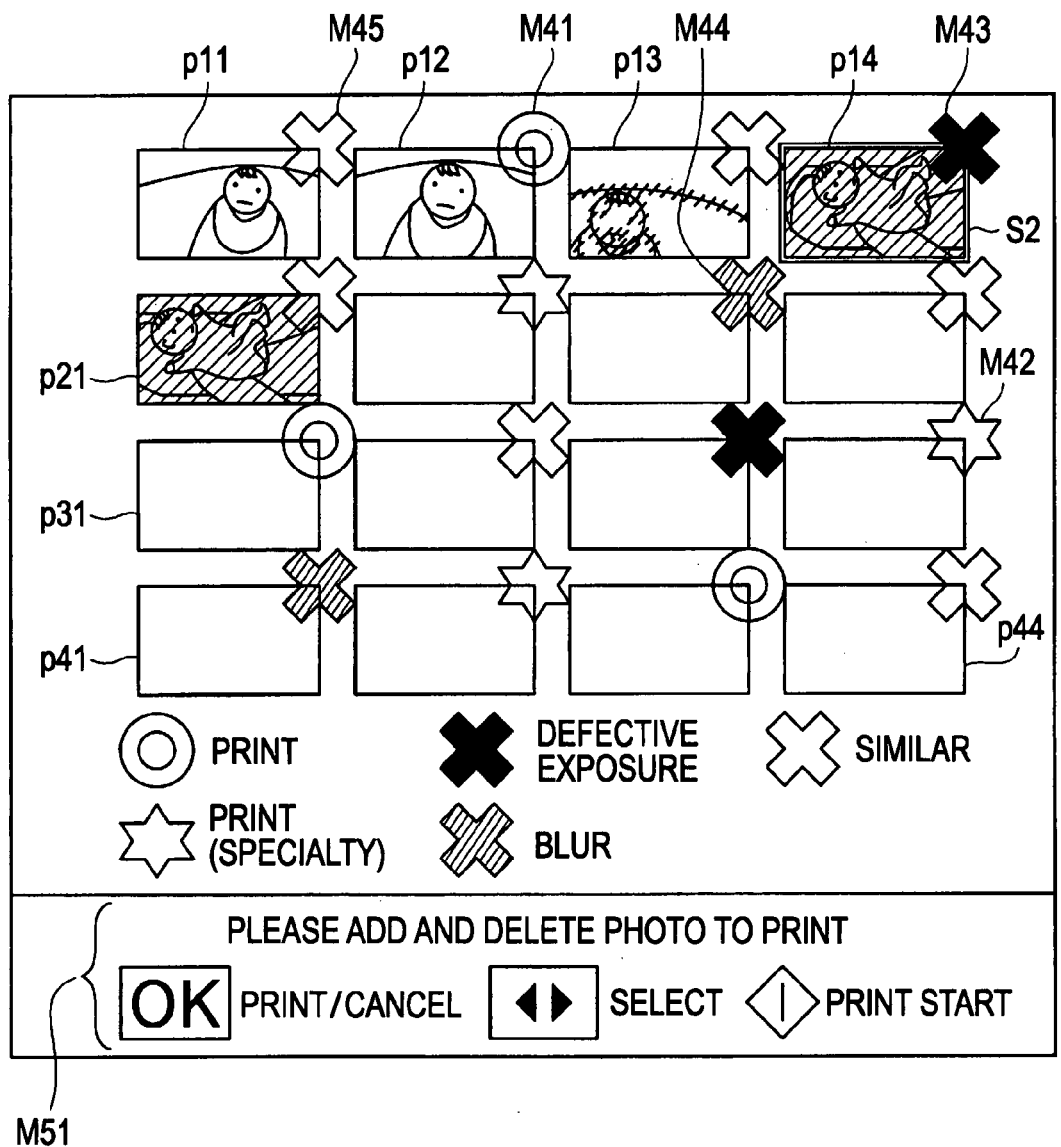
FIG. 12 is a diagram showing an example of a user interface screen that is displayed on the liquid crystal display 40 at Step S45 shown in FIG. 11.

FIG. 12 is a diagram showing an example of a user interface screen that is displayed on the liquid crystal display 40 at Step S45 shown in FIG. 11. In FIG. 12, the images p11 to p44 of 16 image data files are displayed.

One of marks 'circle', 'star', and three kinds of 'x' is attached to each image. For example, a 'circle' mark M41 indicates that an image with that mark is the image of the first candidate image data file (see Step S42 shown in FIGS. 8 and 9). A 'star' mark M42 indicates that an image with that mark is the image of the second candidate image data file (see Step S44 shown in FIGS. 8 and 10). Moreover, a 'star' mark M42 is not attached to the image of the first candidate image data file. A 'star' mark M42 is attached to the image data file corresponding to both the first candidate image data file and the second candidate image data file.

A white 'x' mark M45 indicates that the corresponding image is an image of an image data file, which is not set as the object to be printed, since the corresponding image is a similar image and an image having a clear contour exists (see Step S422 shown in FIG. 9). A black 'x' mark M43 indicates that the corresponding image is an image of an image data file, which is more evaluated in the image file group but is not set as the object to be printed due to underexposure (see Steps S422, S425, and S426 shown in FIG. 9). A hatched 'x' mark M44 indicates that the corresponding image is an image of an image data file, which is more evaluated in the image file group but is not set as the object to be printed due to a contour blurred more than a predetermined value (see Steps S422 and S423 shown in FIG. 9).

In a lower portion shown in FIG. 12, display M51 that requests the user to select the image data file to be printed is performed.

In FIG. 12, an image p14 is surrounded by a frame S2. This state refers to a state where the image p14 is additionally selected as the object to be printed. When display as shown in FIG. 12 is performed by the liquid crystal display 40, if the user operates the selection button group 586 (see FIG. 2) to select an image and pushes the OK button 582, the image data file of the image is additionally selected as the object to be printed. Then, on the screen shown in FIG. 12, the frame is attached to the image.

If the user selects the image of the candidate image data file with the 'circle' or 'star' mark and pushes the OK button 582, the candidate image data file is excluded from the object to be printed. When the image that was selected and attached with the frame once is selected again and the OK button 582 is pushed, the candidate image data file is excluded from the object to be printed. In such a manner, if necessary, the user excludes the images of the first kind and second candidate image data files from the object to be printed, and adds other image data files than the first kind and second candidate image data files to the object to be printed.

When display as shown in FIG. 12 is performed by the liquid crystal display 40, if the color print button 601 of the start button group 60 (see FIG. 2) is pushed, in addition to the first kind and second candidate image data files, an image selected by the user on the screen shown in FIG. 12 is printed in color. Meanwhile, if the monochrome (B/W) print button 602 is pushed, similarly, in addition to the first kind and second candidate image data files, an image selected by the user on the screen shown in FIG. 12 is printed in monochrome. Moreover, in any cases, an image excluded from the object to be printed by the user on the screen shown in FIG. 12 is not printed.

Thereafter, next 16 images are displayed on the liquid crystal display 40. This processing is repeated until all the image data files in the memory card MC are displayed on the liquid crystal display 40.

Moreover, the processing the displays the user interface screen shown in FIG. 12 and requests the user to input an instruction is executed by user interface unit 140 (see FIG. 1) as a functional part of the CPU 100.

In the second embodiment, in addition to the conditions in the processing shown in FIG. 9 (see Steps S422, S423, S425, and S426) or the conditions in the processing FIG. 10 (see Steps S441 to S445), an image represented by an image data file satisfying a condition that 'the user selects at Step S45 shown in FIG. 11' is printed. Further, even in the image data files not satisfying the conditions in the processing shown in FIG. 9 or 10, an image represented by an image data file satisfying a condition that 'the user selects at Step S45 shown in FIG. 11' is printed.

According to the second embodiment, on the basis of the images automatically selected by the printer 1, the user can manually select images to print and performs printing. For this reason, when image data files among a plurality of image data files are selected, the images can be printed according to the user's intention with small load.

Modifications

Moreover, the invention is not limited to the examples or the embodiments, but various modifications and changes can be made within the scope without departing from the subject matter of the invention. For example, the following modifications can be made.

First Modification

The image data file 200 that is examined about whether or not to select as the object to be printed may have image data 210 as uncompressed data. In this case, the image data 210 is preferably image data of a TIFF (Tagged Image File Format) format in which the colors of the pixels are represented by a YCrCb calorimetric system or a RGB calorimetric system. Further, the image data file 200 may have image data 210 as compressed data. In this case, the image data 210 is preferably image data of a JPEG format in which the colors of the pixels are represented by a YCrCb calorimetric system.

Second Modification

At Step S20 shown in FIG. 7 in the first embodiment, whether or not the two image data files belong to the same file group can be determined as follows.

That is, when an image differential characteristic value DI to be obtained by Equation 1 is smaller than an image threshold value Thi, it can be determined that the two image data files belong to the same file group. Moreover, the image differential characteristic value DI is the sum of the number of pixels having gray scale values 0 to 255 of red, green, and blue in the two image data files.

$$DI = \sum_{i=0}^{255} |Nr1(i) - Nr2(i)| + \sum_{i=0}^{255} |Ng1(i) - Ng2(i)| + \sum_{i=0}^{255} |Nb1(i) - Nb2(i)| \quad (1)$$

Here, $Nr1(i)$ denotes the number of pixels having a gray scale value i (where i=0 to 255) of red in image data of an image data file having a short photographing time of the two image data files. $Nr2(i)$ denotes the number of pixels having a gray scale value i (where i=0 to 255) of red in image data in an image data file having a long photographing time of the two image data files. Moreover, in this embodiment, it is assumed that the colors of the pixels in the image data are represented by the gray scale values 0 to 255 of red, green, and blue.

Similarly, $Ng1(i)$ denotes the number of pixels having a gray scale value i (where i=0 to 255) of green in the image data in the image data file having a short photographing time of the two image data files. $Ng2(i)$ denotes the number of pixels having a gray scale value i (where i=0 to 255) of green in the image data in the image data file having a long photographing time. $Nb1(i)$ denotes the number of pixels having a gray scale value i (where i=0 to 255) of blue in the image data in the image data file having a short photographing time of the two image data files. $Nb2(i)$ denotes the number of pixels having a gray scale value i (where i=0 to 255) of blue in the image data in the image data file having a long photographing time. In Equation 1, a symbol '|−|' represents an absolute value.

Further, whether or not the two image data files belong the same file group can be determined by another method. For example, whether or not the two image data files belong to the same file group can also be determined by comparing differential characteristic values DIr, DIg, and DIb to be obtained on the basis of Equations 2 to 4 with corresponding threshold values.

$$DIr = \sum_{i=0}^{255} |Nr1(i) - Nr2(i)| \quad (2)$$

$$DIg = \sum_{i=0}^{255} |Ng1(i) - Ng2(i)| \quad (3)$$

$$DIb = \sum_{i=0}^{255} |Nb1(i) - Nb2(i)| \quad (4)$$

In this case, for example, when one of DIr, DIg, and DIb is larger than the corresponding threshold value, it can be determined that the two image data files belong to different file groups. That is, in this case, when the distribution of the gray scale value of a color component is different from a predetermined amount, it is determined that the two image data files do not belong to the same file group. Accordingly, the image file groups can be classified such that the user can easily recognize the image file groups.

Further, whether or not the two image data files belong to the same file group may be determined on the basis of the comparison between the sum of the weighted values of DIr, DIg, and DIb, and a threshold value. That is, a characteristic value representing a difference between the images is a characteristic value representing a difference between the images of the two image data files. Then, the characteristic value representing the difference between the images may be calculated on the basis of the image data of the two image data files. For example, the characteristic value representing the difference between the images can be calculated on the basis of parameters representing the colors of the pixels in the image data files. The colors of the pixels can be represented by various calorimetric systems, such as an L*a*b* calorimetric system, an HSB colorimetric system, and the like, in addition to the RGB calorimetric system.

Then, whether or not the two image data files belong to the same file group can be determined on the basis of the comparison between one or more characteristic values representing the difference between the images of the image data files and the threshold values corresponding to the characteristic values.

That is, the image file groups of the two image data files can be determined on the basis of the comparison between the characteristic value substantially representing the difference between the images of the image data files and the threshold value.

Third Modification

In the above-described embodiment, when selecting the image data files from the image file group (see Step S40 shown in FIG. 7), the image data file having the smallest minimum width Wt of the contour line is selected (see Step S422 shown in FIG. 9). However, the image data files from the image file groups can be selected by other methods.

For example, first, a face region in the image is determined while matching a portion of the image in the image data sequentially with a reference pattern regarding a basic pattern of the eyes and mouth of the human being. The face region can be, for example, a rectangular region in which the relative size and position with respect the matching reference pattern are determined.

Meanwhile, a map or table of an evaluation value to be determined according to the ratio of the size of the face region in the image and the position of the face region in the image is prepared. This evaluation value is an evaluation value for judging whether or not the image is a desirable image to the user. The evaluation value may be determined on the basis of the experience, or may be determined on the result of a questionnaire.

Then, the evaluation value of the image data file is determined on the size and position of the face region specified in the image data while referring to the map or the like. An image data file having the highest evaluation value in the image file group is selected as the candidate image data file to be output (see Step S40 shown in FIG. 7).

If the image data file is selected in such a manner, from the image file group of the image data files taken by people, an image data file that the user wants to output can be selected.

Fourth Modification

In the above-described embodiment, when the exposure program 225 (see FIG. 3) in the additional information of the first image data file to be examined is 'exposure preference' or 'shutter preference', and the exposure program 225 in the additional information of the previous second image data file is 'normal program', the first image data file is determined as the second candidate image data file (see Steps S441 and S446 shown in FIG. 10). However, when the exposure program 225 of the first image data file is 'manual', as well as when the exposure program 225 of the first image data file is 'exposure preference' or 'shutter preference', similarly, the first image data file may be used as the second candidate image data file.

In the above-described embodiment, when the photographing scene type 228 (see FIG. 3) in the additional information of the first image data file to be examined is 'night scene', and the photographing scene type 228 in the additional information of the previous second image data file is 'standard', the first image data file is determined as the second candidate image data file (see Steps S443 and S446 shown in FIG. 10). However, when the photographing scene type 228 of the first image data file is 'scene', 'character', or other modes that are set according to the user's intention, as well as when the photographing scene type 228 of the first image data file is 'night scene', similarly, the first image data file can be used as the second candidate image data file.

Further, in the above-described embodiment, the information, such as 'standard', 'scene', 'character', and 'night scene', is selectively stored in the 'photographing scene type' regarding the setting about the photographing scene when the image was taken. However, information regarding other modes than the above-described modes may be stored in the data regarding the setting about the photographing scene. Accordingly, when the corresponding mode is set in a given image data file, and the 'standard' mode is set in the image data file having the previous photographing time, the corresponding image data file can be selected as the second candidate image data file.

In the above-described embodiment, when the subject distance range 229 (see FIG. 3) in the additional information of the first image data file to be examined is 'macro', and the subject distance range 229 in the additional information of the previous second image data file is 'unknown', the first image data file is determined as the second candidate image data file (see Steps S444 and S446 shown in FIG. 10). However, when the subject distance range 229 of the first image data file is 'near view', 'distant view', or other modes that are set according to the user's intention, as well as when the subject distance range 229 of the first image data file is 'macro', similarly, the first image data file can be used as the second candidate image data file.

That is, at least one of the selection conditions for selecting the candidate image data files to be output preferably partially includes the following subordinate condition. That is, preferably, the selection criterion data as the criterion of selection judgment is data regarding a mode about a predetermined operation upon photographing in a photographing apparatus for taking images and generating image data files. The selection criterion data is data regarding one of a plurality of modes including a first mode that the user should intentionally set by operating the photographing apparatus before photographing, and a second mode that is set or recorded by the photographing apparatus or other apparatuses when the operation mode is not assigned by the user before photographing. The subordinate condition included in the selection condition is a condition that the selection criterion data of the first image data file is data regarding the first mode and the selection criterion data of the second image data file is data regarding the second mode.

Moreover, the second mode is a mode that is set as called 'default' in the photographing apparatus. The second mode may be a mode that is set when power is applied for the first time after the photographing apparatus is shipped from the factory as a product.

Fifth Modification

In the second embodiment, the 'star' mark M42 indicating the second candidate image data file is attached to the image of the image data file corresponding to both the first candidate image data file and the second candidate image data file. Alternatively, a mark indicating the first candidate image data file may be attached to the image of the image data file corresponding to both the first candidate image data file and the second candidate image data file.

Further, both a mark indicating the first candidate image data file and a mark regarding the second candidate image data file may be attached to the image of the image data file corresponding to both the first candidate image data file and the second candidate image data file.

In addition, a mark indicating that the image corresponds to both the first candidate image data file and the second candidate image data file may be attached to the image of the image data corresponding to both the first candidate image data file and the second candidate image data file.

In the second embodiment, the marks, such as 'circle' and 'star', other than characters are attached to the images p11 to p44. However, instead of the marks, the characters of Japanese, English, or other languages or numerals may be attached to the image so as to indicate the image of the first or second candidate image data file.

In addition, a predetermined image other than the image of the second candidate image data file, for example, an image of an image data file that is not set as the object to be printed since it is a similar image and an image having a clear contour exists may be displayed without any mark. Further, similarly, for an image of an image data file that is not set as the object to be printed due to defective exposure and an image of an image data file that is not set as the object to be printed since the contour is blurred more than a predetermined level, the marks or characters may be attached.

That is, arbitrary marks (including characters and numerals) may be attached or not attached to the individual images. However, preferably, the mark that is attached to the image of the second candidate image data file is not attached to the image of the image data file that does not correspond to the second candidate image data file.

Sixth Modification

In the above-described embodiment, among the image data files for which the photographing condition is specifically set, the initial image data file is selected as the second candidate image data file (see the descriptions of Steps S441 to S445 shown in FIG. 10). However, all the image data files for which the photographing condition is specifically set may be set as the second candidate image data file. In this case, in the processing of Steps S441 to S445 shown in FIG. 10, the condition that the setting of the previous second image data file is 'normal program', 'auto mode', or the like is not imposed upon the selection as the second candidate image data file.

Further, among a plurality of image data files that belong to the same image file group and for which the photographing condition is not specifically set, only the first and last images in a sequence of the photographing time may be printed. In addition, among the plurality of image data files, every n image data files (where n is an integer number of one or more) in the sequence of the photographing time may be selected as the second candidate image data file.

Seventh Modification

In the above-described embodiment, the photographing time is determined on the basis of the 'original image data generation date and time' 223. However, the photographing time may be determined on the basis of the 'digital data creation date and time' 224.

Further, the image data file 200 based on the standard of Exif version 2.2 has data about 'time on 1 second or less of the original image data generation date and time (SubsecTimeoriginal)' or data about 'digital data creation date and time (SubsecTimeDigitized)'. Accordingly, the difference in the photographing time may be calculated on the basis of such data, in addition to the 'original image data generation date and time' 223 or the 'digital data creation date and time' 224.

Eighth Modification

In this embodiment, the printer 1 includes the card slot 70 into which the memory card is inserted to read data. Alternatively, the printer 1 may be other devices that receive the image data file, instead of the card slot 70. For example, the printer 1 may include a communication unit that can receive the image data file from the outside through a wired or wireless communication line.

Further, in this embodiment, the printer 1 includes a push type switch for information input. Alternatively, the printer 1 may be a switch of another type. For example, the printer 1 may include a rotary switch for display switching of the display 40 or a predetermined switch that admits the displayed content and then performs a next processing. In addition, a touch screen may be used as a display device, such as the liquid crystal display 40 or an EL display (ElectroLuminescent Display). That is, the printing apparatus may substantially include a switch that, when the user inputs an instruction, at least partially assists the input.

In an all-in-one type printer, it is not easy to provide a display device having a size exceeding 10 inches. For this reason, it is difficult to cause the display device to display a plurality of images and allow the user the images to be printed on the basis of the display. Accordingly, if the printing apparatus is configured to automatically select the image data files to be printed and print the selected image data files, the user can print the images with a simple processing using only the printing apparatus without imposing the processing of selecting the images on a personal computer.

Ninth Modification

In the above-described embodiment, an example of the all-in-one type printer 1 has been described (see FIG. 1). However, the invention can be applied to various processing that are performed on the basis of the candidate image data files selected among the plurality of image data files. An example of the invention can be implemented, for example, by a computer system that includes a display unit, such as a liquid crystal display or a plasma display, an input unit, such as a keyboard or a mouse, a CPU, and a main memory. In this example, the CPU of the computer system has the same functions as those of the CPU 100 in the above-described embodiment. Then, the images of the selected image data files are displayed on the display unit.

Another example of the invention can be implemented by a system that includes a projector system for projecting the selected image data files as the candidate image data files onto a plane or a space. That is, the output of the image data files is not limited to printing on a printing medium, but it can be realized in various ways, display on the display device or projection onto the outside by a projection unit.

Tenth Modification

In the above-described embodiment, a part of the configuration that is implemented by hardware may be substituted with software. To the contrary, a part of the configuration that is implemented by software may be substituted with hardware. For example, some of the functions of the CPU may be executed by a hardware circuit.

A computer program that implements these functions is provided to be recorded on a computer-readable recording medium, such as a floppy disk or a CD-ROM. A host computer reads the computer program from the recording medium and transmits the read computer program to an internal storage device or an external storage device. Alternatively, the computer program may be supplied from a program supply device to the host computer through a communication path. When implementing the functions of the computer program, the computer program stored in the internal storage device is executed by a microprocessor of the host computer. Further, the host computer may directly execute the computer program recorded on the recording medium.

The term 'computer' used herein denotes a concept including a hardware apparatus and an operation system, and means the hardware apparatus that operates under the control of the operation system. The computer program causes the computer to implement the functions of the above-described parts. Moreover, some of the above-described functions may be implemented by the operation system, not an application program.

Moreover, the 'computer-readable recording medium' used herein includes internal storage devices in a computer, such as various RAMs or ROMs, or external storage devices fixed in the computer, such as hard disks, as well as a portable recording medium, such as a flexible disk or a CD-ROM.

The disclosure of Japanese Patent Application No. 2006-88094 filed Mar. 28, 2006 including specification, drawings and claims is incorporated herein by reference in its entirety.

What is claimed is:

1. A printing apparatus comprising:
an image data file acquisition unit that acquires a plurality of image data files, each having image data regarding an image and additional data regarding at least a photographing condition when the image was taken;
a candidate file selection unit that selects, from among the plurality of image data files, image data files which have additional data satisfying one or more predetermined selection conditions as candidate image data files; and
a printing unit that performs printing of images represented by at least one of the candidate image data files;
wherein the additional data includes photographing time data regarding a photographing time of the image and selection criterion data regarding at least a photographing condition different from the photographing time of the image, and
the one or more predetermined selection conditions include a condition that the selection criterion data of a first image data file being evaluated for selection represents a photographing condition that is different from a photographing condition represented by the selection criterion data of a second image data file, the second image data file having a photographing time immediately before a photographing time of the first image data file among the plurality of image data files.

2. The printing apparatus according to claim 1,
wherein the selection criterion data is operating mode data regarding one of a plurality of operating modes in a photographing apparatus for taking images and generating image data files, the plurality of operating modes including a first operating mode that is intentionally set by a user and a second operating mode that is set when the first operating mode is not set by the user, and
at least one of the one or more predetermined selection conditions includes a condition that the operating mode data of the first image data file is data regarding the first operating mode and the operating mode data of the second image data file is data regarding the second operating mode.

3. The printing apparatus according to claim 1,
wherein the selection criterion data is exposure data regarding one of a plurality of exposure modes in a photographing apparatus for taking images and generating image data files, the plurality of exposure modes including an exposure preference mode, a shutter preference mode, and a normal mode, the normal mode being used when an exposure mode is not assigned by a user, and
at least one of the one or more predetermined selection conditions includes a condition that the exposure data of the first image data file is data regarding the exposure preference mode or the shutter preference mode and the exposure data of the second image data file is data regarding the normal mode.

4. The printing apparatus according to claim 1,
wherein the selection criterion data is photographing scene data regarding one of a plurality of photographing scene modes of a photographing apparatus for taking images and generating image data files, the plurality of photographing scene modes including a night scene mode and a standard mode, the standard mode being used when a photographing scene mode is not assigned by a user, and
at least one of the one or more predetermined selection conditions includes a condition that the photographing scene data of the first image data file is data regarding the night scene mode and the photographing scene data of the second image data file is data regarding the standard mode.

5. The printing apparatus according to claim 1,
wherein the selection criterion data is subject distance range data regarding one of a plurality of subject distance range modes in a photographing apparatus for taking images and generating image data files, the plurality of subject distance range modes including a macro mode and an unknown mode, the unknown mode being used when a subject distance range mode is not assigned by a user, and
at least one of the one or more predetermined selection conditions includes a condition that the subject distance range data of the first image data file is data regarding the macro mode and the subject distance range data of the second image data file is data regarding the unknown mode.

6. The printing apparatus according to claim 1,
wherein the selection criterion data is flash data regarding one of flash modes of a photographing apparatus for taking images and generating image data files, the plurality of flash modes including a flash use mode, in which a flash is automatically turned on, a flash prohibition mode, in which turning on the flash is prohibited, and an auto mode, the auto mode being used when a flash mode is not assigned by a user, and
at least one of the one or more predetermined selection conditions includes a condition that the flash data of the first image data file is data regarding the flash use mode or the flash prohibition mode and the flash data of the second image data file is data regarding the auto mode.

7. The printing apparatus according to claim 1,
wherein the selection criterion data is exposure bias value data regarding an exposure bias value of a photographing apparatus for taking images and generating image data files, and
at least one of the one or more predetermined selection conditions includes a condition that the exposure bias value data of the first image data file is data regarding a positive or negative exposure bias value other than 0 (zero) and the exposure bias value data of the second image data file is data regarding an exposure bias value of 0 (zero).

8. The printing apparatus according to claim 1, further comprising:
a display unit configured to display images represented by the plurality of image data files; and
a user interface unit that displays the images represented by the candidate image data files on the display unit and requests the user to select one or more image data files to be output.

9. The printing apparatus according to claim 8,
wherein the candidate file selection unit selects the candidate image data files on the basis of at least the image data, before the user interface unit displays images on the display unit, and
the user interface unit displays the images represented by the candidate image data files having additional data satisfying the one or more predetermined selection conditions together on the display unit with a predetermined mark, and displays the images represented by the candidate image data files selected on the basis of the image data on the display unit without the mark.

10. The printing apparatus according to claim 1,
wherein at least one of the one or more predetermined selection conditions includes a condition that the additional data of the first image data file includes data regarding photographing conditions that are intentionally set by a user in a photographing apparatus for taking images and generating image data files.

11. An image data file processing apparatus comprising:
an image data file acquisition unit that acquires a plurality of image data files, each having image data regarding an image and additional data regarding at least a photographing condition when the image was taken;
a candidate file selection unit that selects, from among the plurality of image data files, image data files which have additional data satisfying one or more predetermined selection conditions as candidate image data files to be output;
wherein the additional data includes photographing time data regarding a photographing time of the image and selection criterion data regarding at least a photographing condition different from the photographing time of the image, and
the one or more predetermined selection conditions include a condition that the selection criterion data of a first image data file being evaluated for selection represents a photographing condition that is different from a photographing condition represented by the selection criterion data of a second image data file, the second image data file having a photographing time immediately before a photographing time of the first image data file among the plurality of image data files.

12. A method of selecting candidate image data files to be output from among a plurality of image data files, the method comprising:
acquiring the plurality of image data files, each having image data regarding an image and additional data regarding at least a photographing condition when the image was taken; and
selecting image data files which have additional data satisfying one or more predetermined selection conditions as the candidate image data files to be output;
wherein the additional data includes photographing time data regarding a photographing time of the image and selection criterion data regarding at least a photographing condition different from the photographing time of the image, and
the one or more predetermined selection conditions include a condition that the selection criterion data of a first image data file being evaluated for selection represents a photographing condition that is different from a photographing condition represented by the selection criterion data of a second image data file, the second image data file having a photographing time immediately before a photographing time of the first image data file among the plurality of image data files.

13. A method of assisting a user in selecting image data files to be output from among a plurality of image data files, the method comprising:
performing the method according to claim 12; and
displaying images represented by the candidate image data files on a display unit and requesting the user to select image data files to be output.

14. The method according to claim 13, further comprising:
selecting the candidate image data files on the basis of at least the image data before displaying images on the display unit,
wherein displaying images on the display unit and requesting the user to select image data files to be output includes:
displaying the images represented by the candidate image data files having additional data satisfying the one or more predetermined selection conditions together with a predetermined mark; and
displaying the candidate image data files selected on the basis of the image data without the predetermined mark.

* * * * *